US 12,423,086 B2

(12) United States Patent
Kawaura (10) Patent No.: US 12,423,086 B2
(45) Date of Patent: Sep. 23, 2025

(54) CONTROL METHOD OF AN INFORMATION PROCESSING APPARATUS, AND NON-TRANSITORY COMPUTER READABLE STORAGE MEDIUM

(71) Applicant: CANON KABUSHIKI KAISHA, Tokyo (JP)

(72) Inventor: Toshinori Kawaura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 18/480,461

(22) Filed: Oct. 3, 2023

(65) Prior Publication Data
US 2024/0126534 A1   Apr. 18, 2024

(30) Foreign Application Priority Data
Oct. 14, 2022   (JP) .................. 2022-165808

(51) Int. Cl.
*G06F 8/65*   (2018.01)
*G06F 3/12*   (2006.01)
*G06F 9/451*   (2018.01)

(52) U.S. Cl.
CPC .............. *G06F 8/65* (2013.01); *G06F 3/1205* (2013.01); *G06F 3/123* (2013.01); *G06F 9/453* (2018.02)

(58) Field of Classification Search
CPC ... G06F 8/61; G06F 8/65; G06F 3/123; G06F 3/1205; G06F 3/1204; G06F 3/1253; G06F 3/1285; G06F 9/453
See application file for complete search history.

(56) References Cited

U.S. PATENT DOCUMENTS

| 8,705,125 | B2* | 4/2014 | Mori ..................... G06F 3/1257 358/1.9 |
| 12,067,305 | B2* | 8/2024 | Kawaura ............ H04N 1/00037 |
| 2022/0303422 | A1* | 9/2022 | Hatanaka ........... H04N 1/00962 |

FOREIGN PATENT DOCUMENTS

JP   2017-068474   4/2017

* cited by examiner

*Primary Examiner* — Marina Lee
(74) *Attorney, Agent, or Firm* — Venable LLP (57) ABSTRACT

Provided is an information processing system, an information processing method, and a storage medium that can suppress overlapping prompting of the setting and suppress an unexpected setting from being made in the usage. To this end, a PC includes a determination unit that determines whether predetermined setting in a printer has been done or not in one of a setting unit of the printer and a setting unit of the PC. Moreover, a display unit of the PC displays a screen prompting the predetermined setting, based on a determination result of the determination unit.

20 Claims, 8 Drawing Sheets

CONTROL METHOD OF AN INFORMATION PROCESSING APPARATUS, AND NON-TRANSITORY COMPUTER READABLE STORAGE MEDIUM

BACKGROUND OF THE INVENTION

Field of the Invention

The present invention relates to a control method of an information processing apparatus, and a non-transitory computer readable storage medium.

Description of the Related Art

In the case where an electronic apparatus such as a printing apparatus is used, setting for each of setting items is generally performed.

Japanese Patent Laid-Open No. 2017-68474 discloses a setting screen display method in which a user is notified of whether each of settings is a setting already checked by the user.

With an increase in popularity of apparatuses in which setting for each setting item is possible, there is a demand for improving usability of such apparatuses.

SUMMARY OF THE INVENTION

Accordingly, an object of the present invention is to improve usability of an apparatus in which setting for each setting item is possible.

There is provided a control method of an information processing apparatus capable of communicating with an electronic apparatus, comprising: obtaining first information from the electronic apparatus, the first information corresponding to whether setting relating to a predetermined setting item has been already performed or not in the electronic apparatus, performing control such that a setting screen for performing the setting relating to the predetermined setting item is displayed on a display unit of the information processing apparatus, based on that the first information obtained from the electronic apparatus is information corresponding to a fact that the setting relating to the predetermined setting item has not been performed yet in the electronic apparatus, and performing control such that the setting screen is not displayed on the display unit, based on that the first information obtained from the electronic apparatus is information corresponding to a fact that the setting relating to the predetermined setting item has been already performed in the electronic apparatus; and transmitting second information to the electronic apparatus based on an input in the setting screen, the second information being information for performing the setting relating to the predetermined setting item on the electronic apparatus, wherein in a case where the electronic apparatus receives the second information, the setting relating to the predetermined setting item is executed in the electronic apparatus based on the second information.

According to the present invention, it is possible to suppress overlapping setting from being performed and suppress an unexpected setting from being made.

Further features of the present invention will become apparent from the following description of exemplary embodiments with reference to the attached drawings.

DESCRIPTION OF THE EMBODIMENTS

First Embodiment

A first embodiment of the present invention is described with reference to the drawings. A printer configured to print an image is described as an example of an electronic apparatus in the present embodiment. However, the electronic apparatus is not limited to this, and processes in the present embodiment may be applied to various apparatuses such as a PC, a smartphone, and a digital camera. Moreover, a PC is described as an example of an information processing apparatus in the present embodiment. However, the information processing apparatus is not limited to this, and the processes in the present embodiment may be applied to various apparatuses such as a smartphone and a digital camera.

Moreover, in a setup process performed in the PC and an initial setting process performed in the printer, multiple settings are generally done, and processes that allow usage of the printer are done. In the present embodiment, settings relating to a function (hereinafter, automatic update function) of automatically updating firmware that is used to control the printer and that is stored in a storage area of the printer are described as examples of setting items that do not have to be set after they are once set. Description of other settings are omitted.

Figure 1:
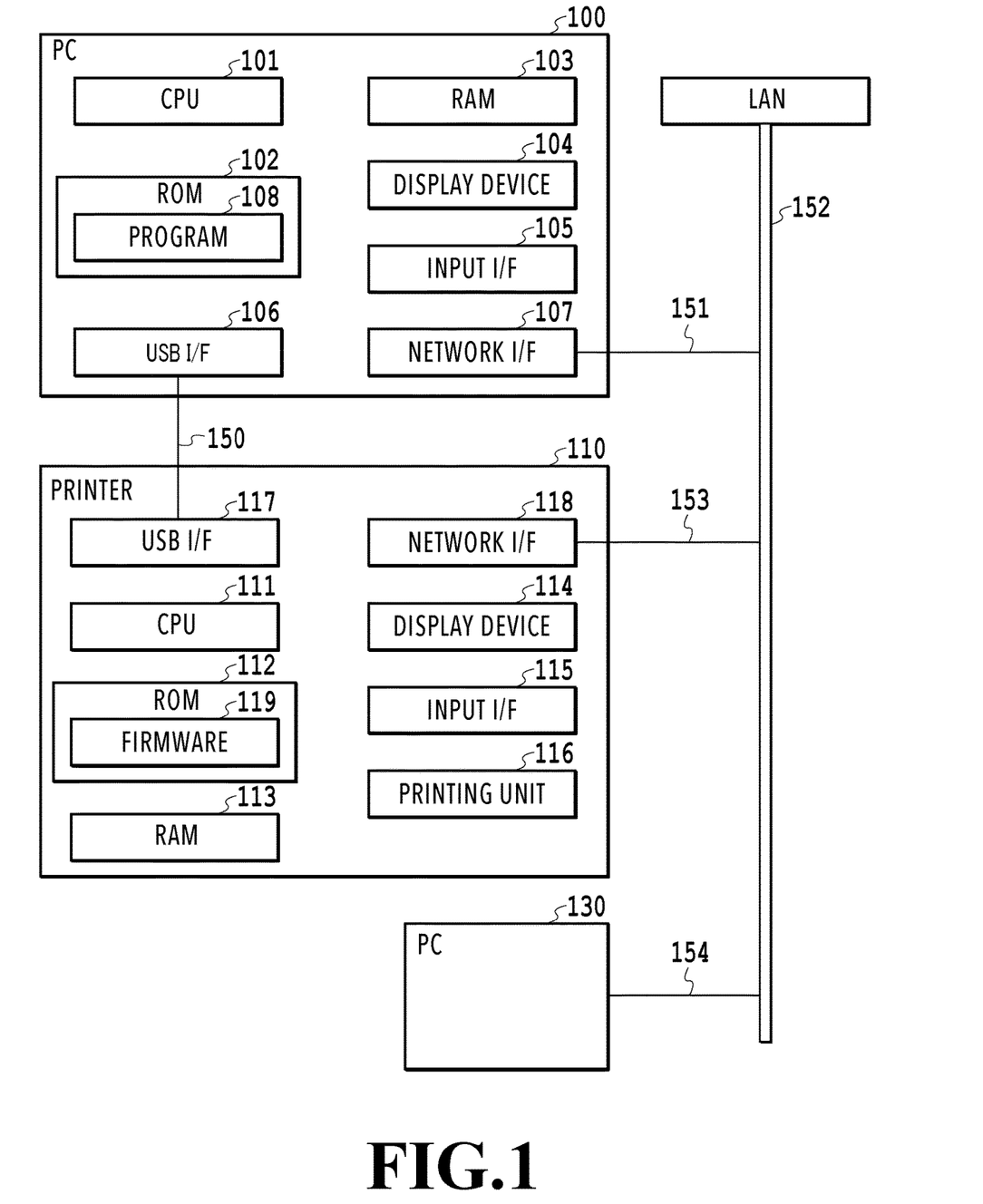
FIG. 1 is a diagram illustrating a system configuration.

FIG. 1 is a diagram illustrating a system configuration in the present embodiment. A system configuration in the present embodiment is a communication system configuration including a personal computer (hereinafter, referred to as PC) 100, a printer 110, and a local area network (hereinafter, referred to as LAN) 152. Moreover, a second PC 130 is connected to the system configuration in the present embodiment.

The PC 100 includes a CPU 101, a ROM 102, a RAM 103, a display device 104 such as a liquid crystal display (LCD), an input interface (I/F) 105, a USB OF 106, and a network I/F 107. The ROM 102 stores various programs such as a setup program 108 that sets up the printer 110 such that the printer 110 can be used from the PC 100. Details of processes of the setup program 108 are described later. The CPU 101 can execute various types of processes by reading out the programs from the ROM 102 to the RAM 103 and executing the programs. The setup program 108 is a program for executing the setup process to be described later. Note that the setup program 108 may be capable of executing other processes. For example, the setup program 108 may be capable of executing a connection setting process in which information on an external access point is transmitted from the PC 100 to the printer 110 to connect the printer 110 and the external access point corresponding to this information to each other.

The PC 100 can communicate with the printer 110 via a USB cable 150. Moreover, the PC 100 can be connected to the LAN 152 via a network 151. In the case where the printer 110 can be also connected to the LAN 152, the PC 100 and the printer 110 can communicate with each other via the LAN 152.

The printer 110 includes a CPU 111, a ROM 112, a RAM 113, a display device 114 such as a liquid crystal display (LCD), an input I/F 115, a printing unit 116, a USB I/F 117, and a network I/F 118. The ROM 112 stores firmware 119 that is a program. The CPU 111 executes various types of controls by the printer 110 by reading out the firmware 119 from the ROM 112 to the RAM 113 and executing the firmware 119. The printer 110 can be connected to the LAN 152 via a network 153. Note that the printer 110 does not have to include the display device 114. In this case, the printer 110 executes various types of settings and processes, based on an operation from a user received via the input I/F 115 or a command received from an external apparatus via the network I/F 118.

The second PC 130 has the same configuration as the PC 100, is connected to the LAN 152 via a LAN cable 154, and can intercommunicate with the PC 100 and the printer 110.

Although the processes are distributed between the PC 100 and the printer 110 as described above as an example in FIG. 1, a form of distribution is not limited to this and may be other forms.

In the present embodiment, a user who has purchased the printer 110 executes an initial installation job of the printer after the arrival of the printer 110. The initial installation job of the printer is a job including operations that the user needs to perform only once on the printer after the purchase to make the printer 110 usable, and it includes an operation of removing a protection tape attached to the printer 110 and an operation of attaching an ink cartridge. The operation of attaching the ink cartridge may be performed again in the case where ink runs out, as a matter of course. Then, the printer 110 executes an initial installation process based on first power-on after the arrival of the printer 110. The initial installation process is a process that progresses by the execution of the initial installation job by the user.

Moreover, the printer 110 in the present embodiment has the automatic update function. The automatic update function is a function for automatically executing update of a predetermined program included in the printer 110. In the present embodiment, the program to be updated by the automatic update function is assumed to be a firmware program of the printer 110. In the printer 110 having the automatic update function, the automatic update function can be enabled (ON) or disabled (OFF), based on an operation received from the user. Note that, in the present embodiment, setting of enabling or disabling the automatic update function is setting relating to the automatic update function. The printer 110 displays a setting screen for performing the setting relating to the automatic update function by, for example, receiving a predetermined operation for performing setting of the printer 110 from the user. Moreover, the printer 110 enables or disables the automatic update function by receiving a user operation on the setting screen. Furthermore, although details are described later, the printer 110 can enable or disable the automatic update function by receiving a setting command from the PC 100. States relating to the automatic update function of the printer 110 are assumed to include a state where the automatic update function is enabled, a state where the automatic update function is disabled, and a state where the automatic update function is neither enabled nor disabled and the setting relating to the automatic update function is not performed. The state where the setting relating to the automatic update function is not performed is specifically, for example, a state where neither the user operation on the aforementioned setting screen nor the reception of the setting command has been performed.

Moreover, the printer 110 can execute setting of enabling or disabling a notification function relating to the update of the firmware. In a state where the notification function is disabled, notification relating to the firmware to be described later is not executed. Moreover, in the state where the notification function is disabled, polling to an update server that provides the firmware program of the printer 110 is not executed. Accordingly, the notification function can be also referred to as a polling function to the update server.

In a state where the automatic update function is enabled, if the printer 110 is connected to a network for communication with the update server that provides the firmware program of the printer 110 and the notification function is enabled, the printer 110 executes the polling to the update server. Then, the printer 110 checks whether the update server can provide firmware whose version is newer than that of the firmware currently included in the printer 110, by performing the polling. In the case where the printer 110 confirms that the update server can provide the firmware whose version is newer than that of the firmware currently included in the printer 110, the printer 110 automatically downloads data relating to the firmware of the newer version from the update server, without receiving a user instruction. At this moment, the notification relating to the firmware is not executed unlike in the state where the automatic update function is disabled. Then, the printer 110 executes the notification relating to the firmware, based on that no operation is performed on the printer 110 or no command is transmitted from an external apparatus to the printer 110 and an idle state thereby continues for predetermined time (for example, five minutes). For example, the notification is displaying of a notification screen, and the notification screen includes a region for notification of presence of the firmware whose version is newer than that of the firmware currently included in the printer 110. Moreover, for example, the notification screen includes a region asking the user whether to immediately execute the firmware update or not. The printer 110 installs the firmware of the newer version and executes the firmware update, based on execution of a user operation indicating immediate execution of the firmware update on the notification screen. In the installing of the firmware of the newer version, the printer 110 downloads the firmware of the newer version from the update server. Meanwhile, in the case where the user performs a user operation indicating no immediate execution of the firmware update, the printer 110 does not install the firmware of the newer version. Moreover, the printer 110 executes predetermined control for not executing the notification relating to the firmware for the next specific time (for example, 24 hours) even if the idle state continues for predetermined time. Note that, in the case where the idle state continues for specific time (for example, 10 minutes) in the state where the predetermined control is executed, the printer 110 automatically installs the firmware of the newer version and executes the firmware update, but it does not execute the notification relating to the firmware. Moreover, the printer 110 automatically installs the firmware of the newer version and executes the firmware update, based on that no operation is performed on a check screen and the idle state further continues for fixed time (for example, five minutes).

The data relating to the firmware of the newer version is specifically, for example, version data indicating which version the firmware of the newer version is. However, for example, the data relating to the firmware of the newer version may be the firmware of the newer version itself, or different data used to install the firmware of the newer version. In the case where the data relating to the firmware of the newer version is the firmware of the newer version itself, there is no need to newly download the firmware of the newer version in the installing of the firmware of the newer version.

In a state where the automatic update function is disabled, if the printer 110 is connected to the network for communication with the update server that provides the firmware program of the printer 110 and the notification function is enabled, the printer 110 executes the polling to the update server. Then, the printer 110 checks whether the update server can provide the firmware whose version is newer than that of the firmware currently included in the printer 110, by performing the polling. In the case where the printer 110 confirms that the update server can provide the firmware whose version is newer than that of the firmware currently included in the printer 110, the printer 110 automatically downloads the data relating to the firmware of the newer version from the update server, without receiving a user instruction. In other words, the processes up to this point are the same as those in the state where the automatic update function is enabled. Then, the printer 110 executes the notification relating to the firmware, based on that the printer 110 confirms that the update server can provide the firmware whose version is newer than that of the firmware currently included in the printer 110. A notification screen displayed in this notification is the same as the notification screen displayed in the notification executed in the state where the automatic update function is enabled. The printer 110 installs the firmware of the newer version and executes the firmware update, based on execution of the user operation indicating immediate execution of the firmware update on the notification screen. In the case where the user performs the user operation indicating no immediate execution of the firmware update on the notification screen, the printer 110 does not install the firmware of the newer version. Moreover, the printer 110 executes predetermined control for not executing the notification relating to the firmware for the next specific time (for example, 24 hours) even if the printer 110 confirms that the update server can provide the firmware whose version is newer than the firmware currently included in the printer 110. Note that, in the state where the automatic update function is disabled, the notification relating to the firmware is not executed even if the idle state continues for predetermined time (for example, five minutes). Moreover, installing of the firmware of the newer version is not automatically executed even if the idle state continues for the predetermined time (for example, five minutes) and then further continues for fixed time (for example, five minutes).

The notification may include, for example, a process of displaying a screen prompting the user to execute an operation for the firmware update. Note that the printer 110 may be capable of receiving the operation for the firmware update as an operation separate from the operation for enabling or disabling the automatic update function, from the user at any timing. In this form, in the case where the printer 110 receives the operation for the firmware update, the printer 110 executes a process in which the data for installing the firmware of the newer version is downloaded and the firmware of the newer version is installed.

As described above, the state where the setting relating to the automatic update function has not been performed is the state where the setting relating to the automatic update function based on reception of the user operation on the printer 110 or the setting command from the external apparatus has not been performed. In the case where the printer 110 includes the display device 114, the printer 110 displays the setting screen for performing the setting relating to the automatic update function in the initial installation process, and it enables or disables the automatic update function based on a user operation performed on the setting screen. Accordingly, in the case where the printer 110 includes the display device 114, the state where the setting relating to the automatic update function has not been performed is a state that may be present only in a period from the first power-on after the arrival of the printer 110 to performing of the setting relating to the automatic update function in the initial installation process. Moreover, in the state where the initial installation process has not completed yet, the notification function is disabled. Accordingly, in the case where the printer 110 includes the display device 114, neither the polling nor the automatic update is performed in the state where the setting relating to the automatic update function has not been performed. Meanwhile, in the case where the printer 110 does not include the display device 114, no setting screen for performing the setting relating to the automatic update function is displayed in the initial installation process. Specifically, the state where the setting relating to the automatic update function has not been performed continues also after the completion of the initial installation process, until the setting command relating to the automatic update function is transmitted from the external apparatus and the setting relating to the automatic update function is performed. After the completion of the initial installation process, processes executed in the state where the setting relating to the automatic update function has not been performed are the same as the processes in the state where the automatic update function is disabled. Specifically, after the completion of the initial installation process, the polling and the notification relating to the firmware are executed depending on whether the notification function is enabled or not, as in the state where the automatic update function is disabled.

Details of each of the states described above are not limited to the aforementioned forms. For example, in the state where the automatic update function is enabled, the notification relating to the firmware does not have to be executed based on the idle state continuing for the predetermined time. Moreover, in the state where the automatic update function is enabled, for example, in the case where the printer 110 confirms that the update server can provide the firmware whose version is newer than that of the firmware currently included in the printer 110, the printer 110 may immediately automatically install the firmware of the newer version and execute the firmware update without receiving a user operation. Furthermore, in the state where the automatic update function is disabled and the state where the setting relating to the automatic update function has not been performed, the polling and the notification relating to the firmware do not have to be executed, irrespective of whether the notification function is enabled or not. Moreover, a form in which there is no setting of the notification function may be employed. In this case, for example, there may be employed a form in which, in the state where the automatic update function is enabled, the polling is always performed if the printer 110 is connected to the network for communication with the update server that provides the firmware program of the printer 110.

Latest firmware includes a fix for patching a bug in old firmware or a new function. However, there are users who do not want an operation of the electric apparatus to be changed without permission. Accordingly, setting of whether to automatically update the firmware to the latest firmware or not is desirably checked by the user and performed. However, the setting of whether to update the firmware to the latest firmware does not have to be performed every time the printer is used. Once the setting is performed, the setting state may be maintained unless the user desires to change the setting by will. Details of the present embodiment is described below based on such a technical background.

Figure 2:
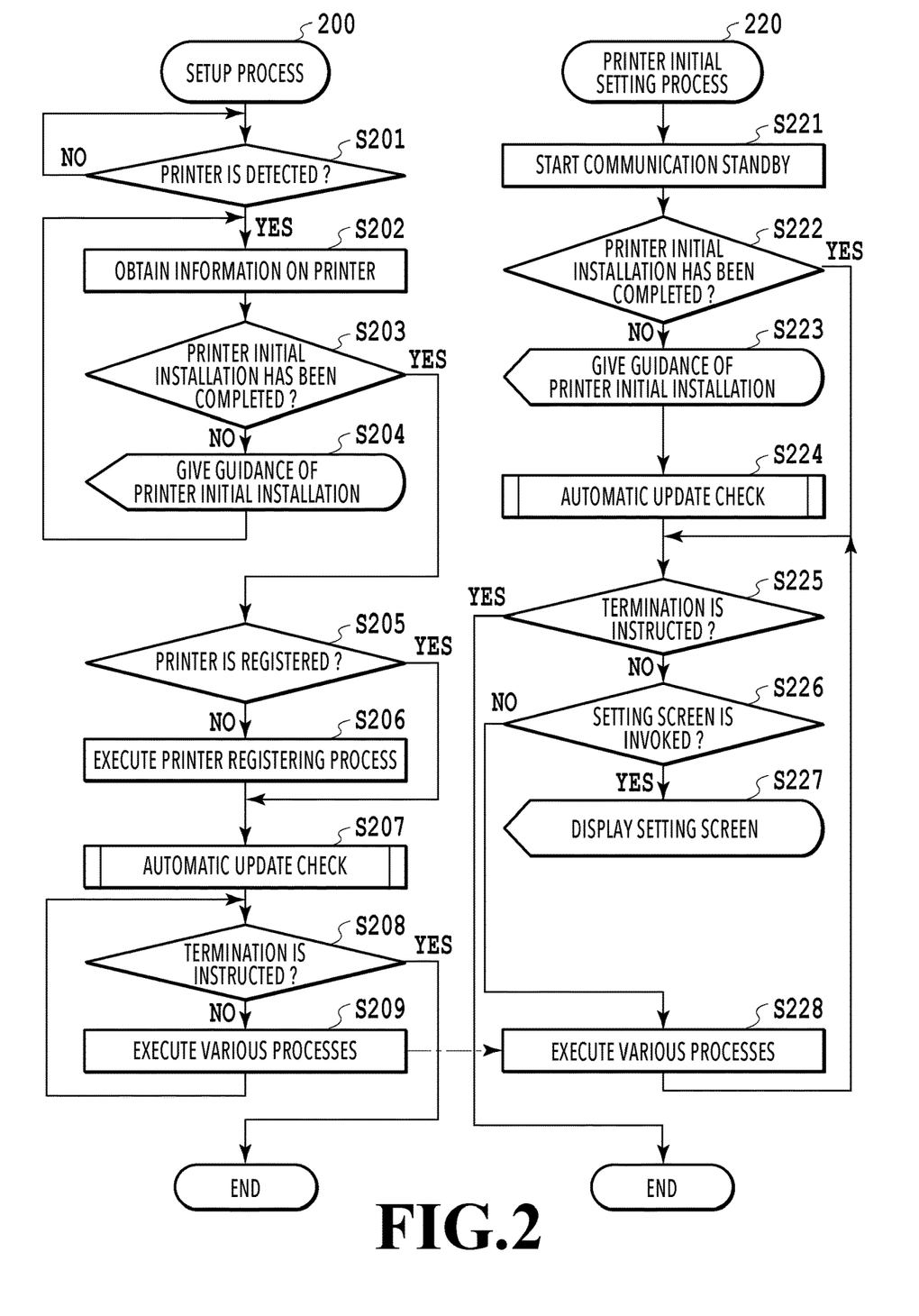
FIG. 2 is a flowchart illustrating a setup process and an initial setting process.
Figure 3A:
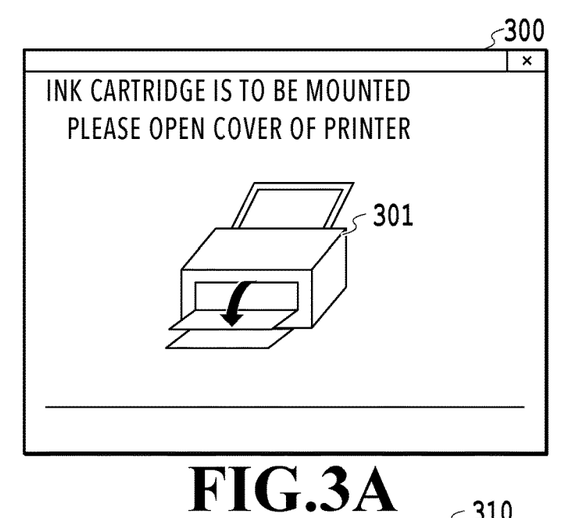
FIG. 3A is a diagram illustrating a display screen displayed on a display device of a PC.
Figure 3B:
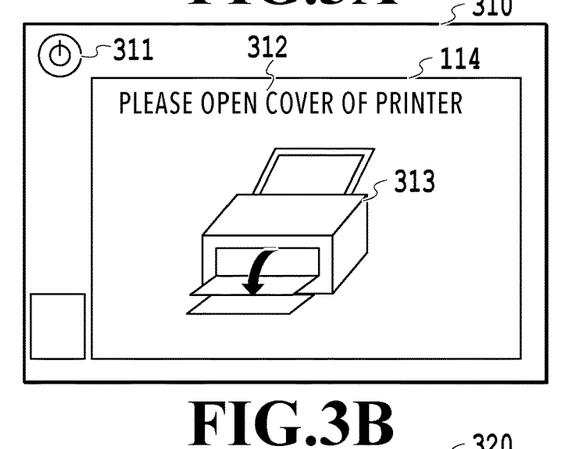
FIG. 3B is a diagram illustrating a display screen displayed on a display device of a printer.

FIG. 2 is a flowchart illustrating a setup process 200 by the setup program 108 stored in the PC 100 and an initial setting process 220 in the printer 110. Moreover, FIG. 3A is a diagram illustrating a screen that is for guidance on the initial installation job of the printer 110 and that is displayed on the display device 104 of the PC 100, and FIG. 3B is a diagram illustrating a screen that is for guidance on the initial installation job of the printer 110 and that is displayed on the display device 114 of the printer 110.

The CPU 101 of the PC 100 performs a series of processes in the setup process 200 illustrated in FIG. 2 by loading a program code stored in the ROM 102 onto the RAM 103 and executing the program code. Note that, in the present embodiment, the program code is the setup program 108. Alternatively, functions of steps in the series of processes in the setup process 200 illustrated in FIG. 2 may be partially or entirely implemented by hardware such as an ASIC or an electronic circuit.

Moreover, the CPU 111 of the printer 110 performs the printer initial setting process 220 illustrated in FIG. 2 by loading a program code stored in the ROM 112 onto the RAM 113 and executing the program code. Alternatively, functions of steps in a series of processes in the printer initial setting process 220 illustrated in FIG. 2 may be partially or entirely implemented by hardware such as an ASIC or an electronic circuit. Note that sign "S" in the description of each process means step in the flowchart.

Since the initial setting of the printer is assumed to be basically performed by one person, the setup process 200 and the printer initial setting process 220 do not have to be performed simultaneously.

First, the setup process 200 in the PC 100 is described. The user gives an instruction to execute the setup program 108 included in the ROM 102 in the PC 100, and the setup program 108 thereby starts the setup process 200. In the case where the setup process 200 is started, in S201, the CPU 101 performs a process of detecting the printer. In this case, the process of detecting the printer 110 is a process of checking whether the printer 110 connected to the USB I/F 106 or the network I/F 107 of the PC 100 via the USB cable 150 or the LAN 152 is present.

Then, the CPU 101 determines whether the setup program 108 has detected the printer in S201. In the case where no printer is detected in S201, the CPU 101 returns to the printer detection process S201 again, and it repeats the detection. In the case where the printer is detected in S201, the CPU 101 proceeds to S202, and obtains information on the detected printer 110. The information obtained in S202 includes information indicating a state of the printer 110, which is information that varies depending on the state of the printer 110. Moreover, the information obtained in S202 includes information indicating whether the initial installation process of the printer 110 has been completed or not. Next, in S203, the CPU 101 determines whether the initial installation process of the printer 110 has been completed or not, based on the information obtained in S202 and indicating whether the initial installation process of the printer 110 has been completed or not. In the case where the CPU 101 determines that the initial installation process of the printer 110 has not been completed in the determination of S203, in S204, the CPU 101 performs display control of performing display relating to the initial installation process of the printer 110.

As an example of the display relating to the initial installation process of the printer 110, the CPU 101 displays a screen 300 that is illustrated in FIG. 3A and that is for guidance on an operation (initial installation job) to be executed by the user for the initial installation process of the printer 110, on the display device 104. The screen 300 is, for example, a screen for guidance on an operation of mounting the ink cartridge in the printer 110. Specifically, the screen 300 displays an image 301 of the printer 110 and a message prompting the user to open a cover of the printer 110 to mount the ink cartridge. Note that the screen 300 may be, for example, a screen for guidance on setting printing paper in the printer 110. Moreover, in the display relating to the initial installation process, both of the screen for guidance on the operation of mounting the ink cartridge in the printer 110 and the screen for guidance on setting printing paper in the printer 110 may be displayed. Furthermore, the screen displayed as the display relating to the initial installation process may be controlled based on the information obtained in S202 and indicating the state of the printer 110. Specifically, for example, in the case where the information indicating the state of the printer 110 indicates a state where no ink cartridge is mounted in the printer 110, the screen for guidance on the operation of mounting the ink cartridge in the printer 110 may be displayed. In the case where the information indicating the state of the printer 110 indicates a state where the ink cartridge is mounted in the printer 110, the screen for guidance on the operation of mounting the ink cartridge in the printer 110 does not have to be displayed. The same applies to the screen for guidance on setting printing paper in the printer 110.

After the display relating to the initial installation process of the printer 110 is performed in S204, the CPU 101 returns to S202, and obtains the information on the printer 110 again. Then, in the case where the initial installation process has not been completed yet at this point, the CPU 101 executes the display relating to the initial installation process of the printer 110 in S204 again. However, in the case where the initial installation job and the initial installation process have progressed from a degree of progress at the execution of the display in previous S204, information corresponding to the progress of the current initial installation process is obtained in S202, and the screen corresponding to the progress of the current initial installation process is displayed in S204. Meanwhile, in the case where the printer 110 has completed the initial installation process, in S203, the CPU 101 determines that the initial installation process of the printer 110 has been completed, and it proceeds to S205.

In S205, the CPU 101 determines whether the printer 110 has been already registered as a printer in a state where it is usable from the PC 100. In the case where the printer 110 is not registered, the CPU 101 proceeds to S206, and executes a printer registering process. In the present embodiment, the state where the printer 110 is usable from the PC 100 corresponds to a state where a printer driver for the printer 110 is installed and a print queue for the printer 110 is created in the PC 100. Accordingly, in the present determination, specifically, the CPU 101 determines, for example, whether the print queue for the printer 110 is in a state where it is created in the printer 110 or not. In the printer registering process S206, the CPU 101 executes a process for installing the printer driver for the printer 110 in the PC 100, and it registers the print queue for the printer 110 in the PC 100 (creates the print queue in the PC 100). The process for installing the printer driver for the printer 110 may be a process of installing the printer driver in the PC 100 by using the setup program 108, a process of prompting the user to execute an operation of installing the printer driver in the PC 100, or a process of displaying a web page for installing the printer driver in the PC 100.

Note that the PC 100 is described to require the driver installing process, assuming a case where an operating system (referred to as OS) such as Windows OS is operating. However, a printing application (not illustrated) having a function of converting data to a print data format directly interpretable by the printer 110 may be installed to use the printer 110. In the form in which the printing application (not illustrated) is installed, the printer registering process S206 is a process in which the printer 110 to be used in the printing application (not illustrated) is specified to be in a preselected state.

In the case where the printer registering process in S206 is completed, the CPU 101 proceeds to S207, and performs an automatic update check process. Meanwhile, also in the case where the CPU 101 determines that the printer 110 is already registered in the PC 100, the CPU 101 proceeds to the automatic update check process in S207. Details of the automatic update check process in S207 are described in FIG. 6 to be described later.

After the automatic update check process, in S208, the CPU 101 determines whether a termination instruction is received from the user. An example of the termination instruction includes a case where the user presses a termination button on a graphic user interface (GUI) of the setup program 108 displayed on the display device 104 by the CPU 101. In S208, in the case where the termination instruction from the user is absent, the CPU 101 proceeds to S209, and executes various processes. The various processes herein are, for example, a process of performing settings of the printer 110, a process of performing test printing, and the like. In the case where the execution of the various processes in S209 is completed, the CPU 101 returns to S208, and determines presence or absence of the termination instruction from the user again. In the case where the CPU 101 determines that the termination instruction from the user is present, the CPU 101 terminates the process.

Next, the initial setting process 220 in the printer 110 is described. In the case where power is supplied (power is turned on) to the printer 110 by pressing of a power button by the user in a state where no initial setting process 220 has been completed in the printer 110, the printer starts the initial setting process 220. The state where no initial setting process 220 has been completed in the printer 110 is, for example, a state just after arrival of the printer 110.

In the case where the initial setting process 220 is started, in S221, the CPU 111 performs a process of starting communication standby, so that the CPU 111 can receive an instruction from the electronic apparatus such as the PC 100.

After S221 that is the communication standby start process, the printer 110 can provide the information on the printer 110 in response to an information obtaining request (process in S202) from the PC 100. Communication between the PC 100 and the printer 110 in the communication standby state may be executed via, for example, USB. Moreover, in this case, the aforementioned connection setting process may be executed between the PC 100 and the printer 110 in the communication standby state. Communication hereinafter may be thereby executed through the connection between the printer 110 and the PC 100 via the external access point. Then, in S222, the CPU 111 determines whether the initial installation job on the printer 110 by the user has been completed or not.

Note that the CPU 101 of the PC 100 and the CPU 111 of the printer 110 determine whether the initial installation job on the printer 110 by the user has been completed in S203 and S222, respectively.

In the case where the CPU 111 determines that the initial installation job on the printer 110 by the user has been completed in S222, the CPU 111 proceeds to S225. In the case where the CPU 111 determines that the initial installation job on the printer 110 by the user has not been completed in S222, the CPU 111 proceeds to S223, and displays a screen 312 that is illustrated in FIG. 3B and that prompts the user to execute the initial installation job of the printer 110, on the display device 114. An operation panel 310 of the printer 110 includes a power button 311 and the display device 114. The display device 114 illustrated in FIG. 3B is a color LCD, and it includes a display region capable of displaying an image 313 and a message of guidance prompting the user to execute the initial installation job of the printer 110.

In the case where the user completes the initial installation job of the printer 110, in S224, the CPU 111 performs the automatic update check process. The automatic update check process of the printer 110 is described in detail in FIG. 5 to be described later. In the case where the automatic update check process is completed in S224, in S225, the CPU 111 checks presence or absence of the termination instruction from the user. In this case, the termination instruction from the user is a case where the user presses the power button 311 illustrated in FIG. 3B.

Figure 3C:
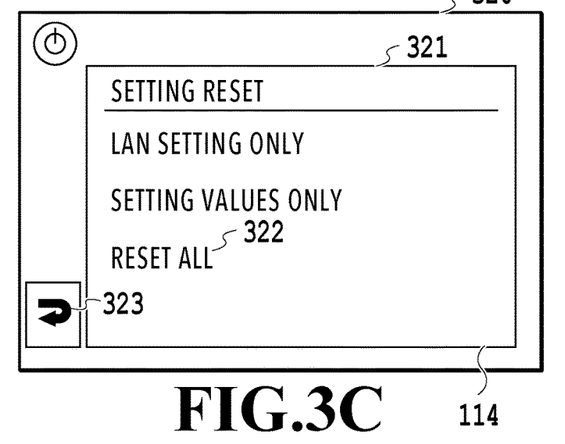
FIG. 3C is a diagram illustrating a display screen displayed on the display device of the printer.

In the case where the CPU 111 determines that the termination instruction from the user is absent in S225, the CPU 111 proceeds to S226, and checks presence or absence of invoking of a setting screen. In the case where the CPU 111 determines that the invoking of the setting screen is present in S226, in S227, the CPU 111 displays a setting screen 321 on the display device 114 on an operation panel 320 as illustrated in FIG. 3C. There are multiple setting screens that can be invoked in S226, and one selected from the multiple screens can be displayed in S227. FIG. 3C illustrates an example in which a "setting reset" function is displayed.

The setting reset function in the printer 110 has a function of "reset all" 322. In the case where the user selects the "reset all" 322 (performs an initialization operation), the CPU 111 performs process of resetting all pieces of setting information to a purchase state (initial state). In the case where the user presses a return button 323 on the operation panel 320, the CPU 111 transitions from the setting reset function display state to another screen. In the case where the setting screen display in S227 is completed, the CPU 111 returns to S225, and checks whether the termination instruction from the user is present or absent again.

Meanwhile, in the case where the CPU 111 determines that the invoking of the setting screen is absent in S226, the CPU 111 completes the initial installation process. Note that, in the case where the initial installation process is completed, the printer 110 stores the completion of the initial installation process by managing a flag relating to the initial installation process. In the case where the power-on is performed hereinafter, the CPU 111 performs control not to proceed to the flow of the initial installation process. Moreover, in S202, the CPU 111 transmits information indicating the completion of the initial installation process to the PC 100. Then, the CPU 111 proceeds to S228 to execute various processes. The various processes herein refer to a process of performing printing according to a print instruction transmitted from the PC 100 and the like. In the case where the execution of various processes in S228 is completed, the CPU 111 returns to S225, and checks whether the termination instruction from the user is present or absent again. In S225, in the case where the CPU 111 determines that the termination instruction from the user is present, the CPU 111 completes the initial setting process.

Note that the initial installation process is not limited to the aforementioned form. For example, other processes may be included in the initial installation process. For example, the initial installation process may include a registration process, a process of receiving setting of current time from the user, and a process of receiving setting of a region or a country in which the printer 110 is used from the user. Moreover, the initial installation process may include a process of detecting presence or absence of abnormality in a print head that is used for printing and that ejects ink and a process of detecting whether a fixed member fixing the print head has been removed by the initial installation operation of the user.

Figure 4A:
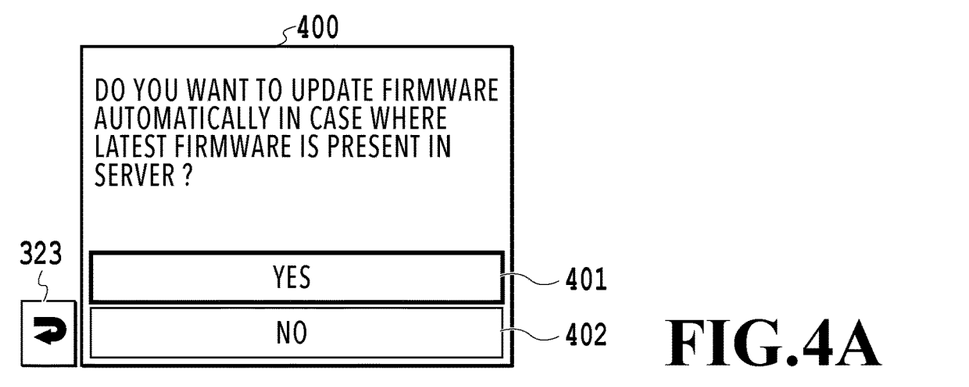
FIG. 4A is a diagram illustrating an automatic update check screen.
Figure 4B:
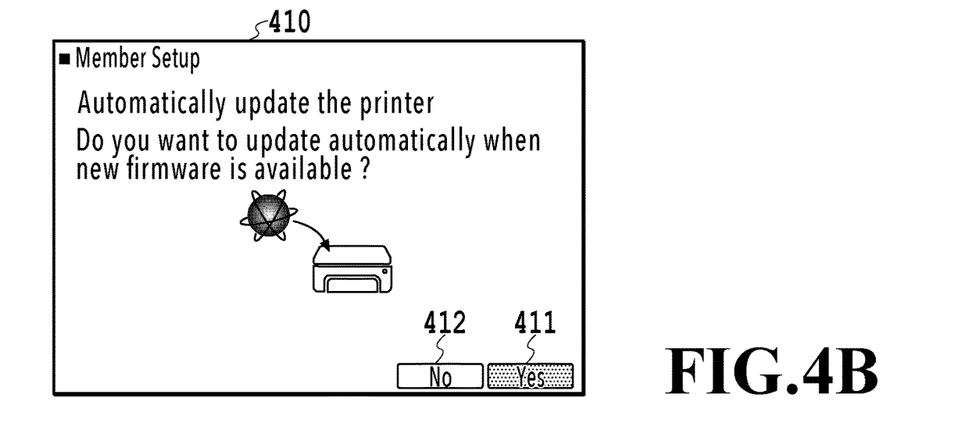
FIG. 4B is a diagram illustrating an automatic update check screen.
Figure 4C:
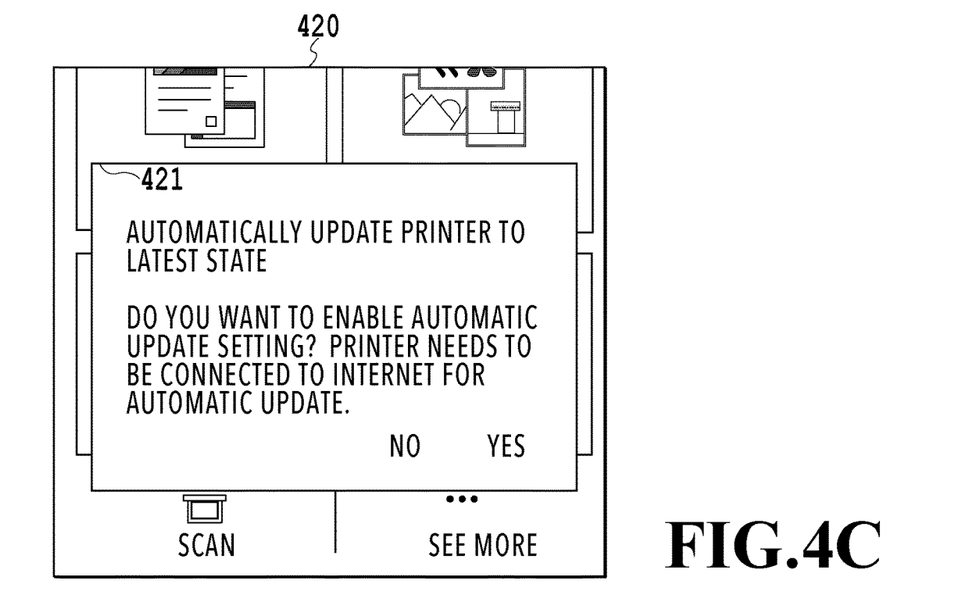
FIG. 4C is a diagram illustrating an automatic update check screen.
Figure 5:
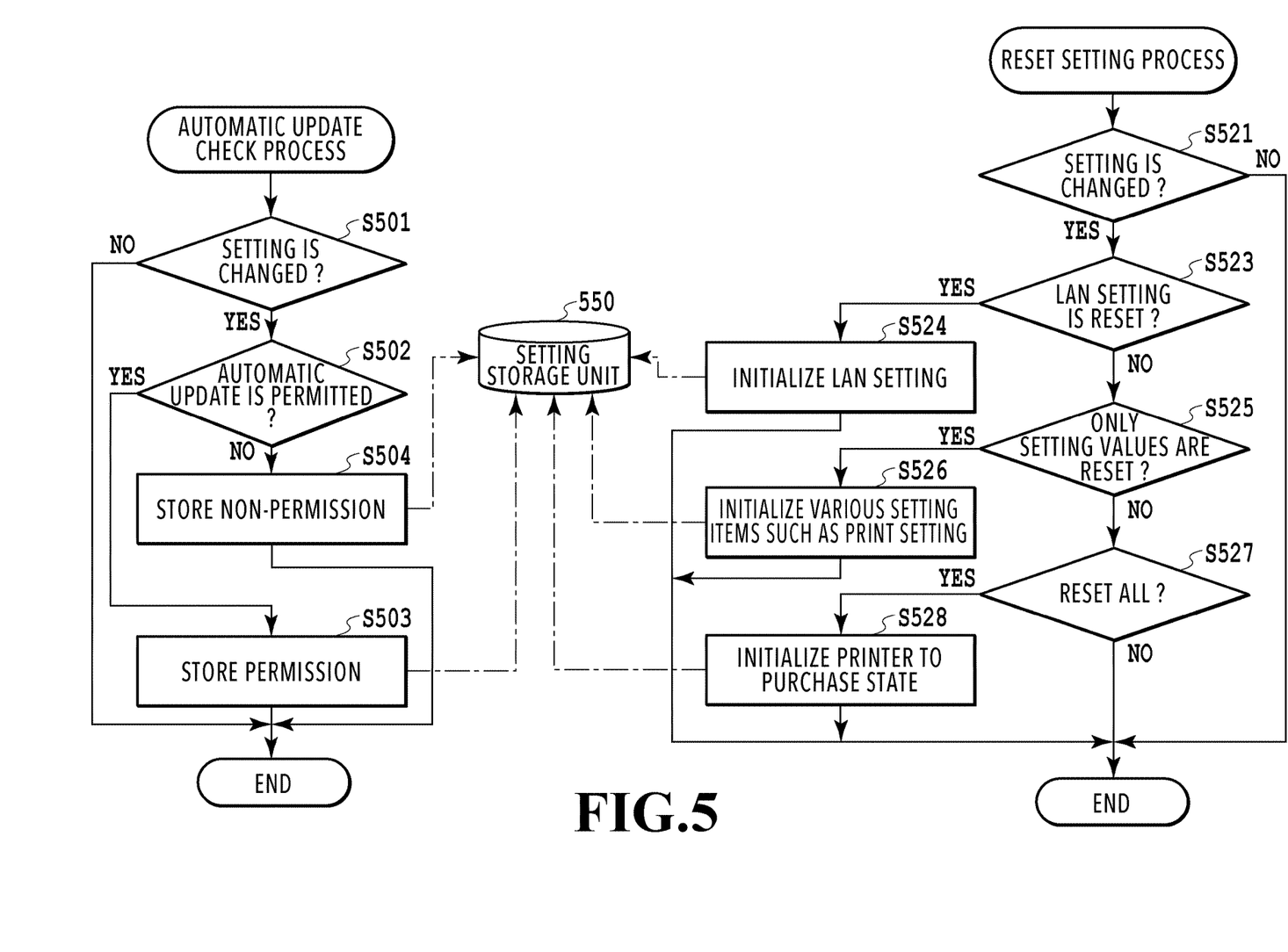
FIG. 5 is a flowchart of an automatic update check process and a reset setting process.

FIG. 4A is a diagram illustrating an automatic update check screen in the printer 110 that is a screen corresponding to the setting screen for performing the setting relating to the automatic update function described above. FIG. 4B is a diagram illustrating an automatic update check screen in the PC 100. FIG. 4C is described later. FIG. 5 is a flowchart illustrating the automatic update check process in the printer 110 and a reset setting process in the printer 110. The automatic update check process of FIG. 5 describes the process in S224 of FIG. 2, and the reset setting process of FIG. 5 describes the process executed in the case where the setting screen of FIG. 3C is displayed in S227 of FIG. 2.

In the case where the automatic update check process illustrated in FIG. 5 is started, the CPU 111 displays the automatic update check screen of FIG. 4A on the display device 114 in the printer 110. Then, in S501, the CPU 111 determines presence or absence of a change in automatic update setting. The determination herein is performed by determining whether any of buttons is pressed in the automatic update check screen 400 illustrated in FIG. 4A. Specifically, the CPU 111 determines that the setting is changed (Yes) in the case where a yes button 401 or a no button 402 is pressed, and it determines that the setting is not changed in the case where the return button 323 is pressed. Note that, in the case where the yes button 401 is pressed, the automatic update function is set to enabled and, in the case where the no button 402 is pressed, the automatic update function is set to disabled. The automatic update check process is performed in the initial setting, and it is performed in a state where no initial setting value is set or in a state where NULL or the like is set. Accordingly, the setting is changed in both of the case where the yes button 401 is pressed and the case where the no button 402 is pressed. In the case where the CPU 111 determines that the automatic update setting is not changed in S501, the CPU 111 terminates the automatic update check process. In the case where the CPU 111 determines that the automatic update setting is changed in S501, the CPU 111 proceeds to S502.

In this example, the return button 323 is an illuminated button that turns on in the case where a return operation is possible. In the automatic update check process in S224 of FIG. 2, in the case where the automatic update check process is performed after the execution of the initial installation guidance of the printer 110 (S223), the return button 323 illustrated in FIG. 4A is not displayed, and the user is made to select one of the yes button 401 and the no button 402. Meanwhile, the multiple setting screens displayed on the display device 114 in S227 of FIG. 2 include a setting screen for performing the automatic update check. This setting screen is invoked by the user in the case where the user desires to change the setting of the automatic update. In the case where the setting screen for performing automatic update check is displayed in S227, the return button 323 is displayed as in FIG. 4A to allow the user to return without selecting whether to permit the automatic update or not.

Upon proceeding to S502, the CPU 111 determines whether the user permits the automatic update or not. In the case where the CPU 111 determines that the user permits the automatic update in S502 (Yes), the CPU 111 proceeds to S503, and records permission information in a setting storage unit 550 included in the ROM 112 of the printer 110. Then, the CPU 111 terminates the automatic update check process of the printer 110.

Meanwhile, in the case where the CPU 111 determines that the user does not permit the automatic update in S502 (No), the CPU 111 proceeds to S504, records non-permission information in the setting storage unit 550, and it terminates the automatic update check process of the printer 110. As described above, the information on whether to permit the automatic update of the printer 110 or not is recorded in the setting storage unit 550.

Although the example in which the setting storage unit 550 is included in the ROM 112 of the printer 110 is described in the present embodiment, the setting storage unit 550 is not limited to this, and may be any storage medium that is communicably connected to the printer 110 and that can store the information.

Next, description is given of the case where the automatic update setting recorded in the setting storage unit 550 is initialized.

In the case where the setting reset screen in FIG. 3C is displayed and the user selects one of items in S227 of FIG. 2, the CPU 111 starts a reset setting process. In the case where the reset setting process is started, in S521, the CPU 111 determines whether the setting change is executed. In the case where no setting change is executed, that is in the case where the user selects the return button 323, the printer 110 terminates the reset setting process.

Meanwhile, in the case where one of the items is selected and the setting change is executed, in S523, the CPU 111 determines whether a printer LAN setting is reset or not. Specifically, the CPU 111 determines whether the user has selected an item of "LAN setting only". In the case where the CPU 111 determines that the user has selected the item of "LAN setting only" (Yes), the CPU 111 proceeds to S524, initializes LAN setting information saved in the setting storage unit 550, and terminates the reset setting process. In this case, the LAN setting information is information stored for connection of the printer 110 to a network such as the LAN 152.

In the case where the CPU 111 determines that the LAN setting is not reset in the determination of S523, that is in the case where the user selects an item other than the "LAN setting only", the CPU 111 proceeds to S525, and determines whether only setting values are reset. Specifically, the CPU 111 determines whether the user has selected an item of "setting values only". In the case where the CPU 111 determines that the user has selected the item of "setting values only" in the determination of S525 (Yes), in S526, the CPU 111 initializes various setting items such as a print setting, and it terminates the reset setting process.

In the case where the CPU 111 determines that the user has not selected the item of "setting values only" in the determination of S525, that is in the case where the CPU 111 determines that the user has selected an item other than the "LAN setting only" and the "setting values only", the CPU 111 proceeds to S527. Then, in S527, the CPU 111 determines whether to initialize the setting information of the printer 110 to the purchase state. Specifically, the CPU 111 determines whether the user has selected an item of "reset all". In the case where the CPU 111 determines that the user has selected the item of "reset all" in the determination of S527 (Yes), in S528, the CPU 111 initializes the setting information of the printer 110 to the purchase state, and it terminates the reset setting process. In the case where the CPU 111 determines that the user has not selected the item of "reset all" in S527 (No), the CPU 111 directly terminates the reset setting process. As described above, the various pieces of setting information including the automatic update setting recorded in the setting storage unit 550 of the printer 110 are sometimes initialized by the reset setting process.

Figure 6:
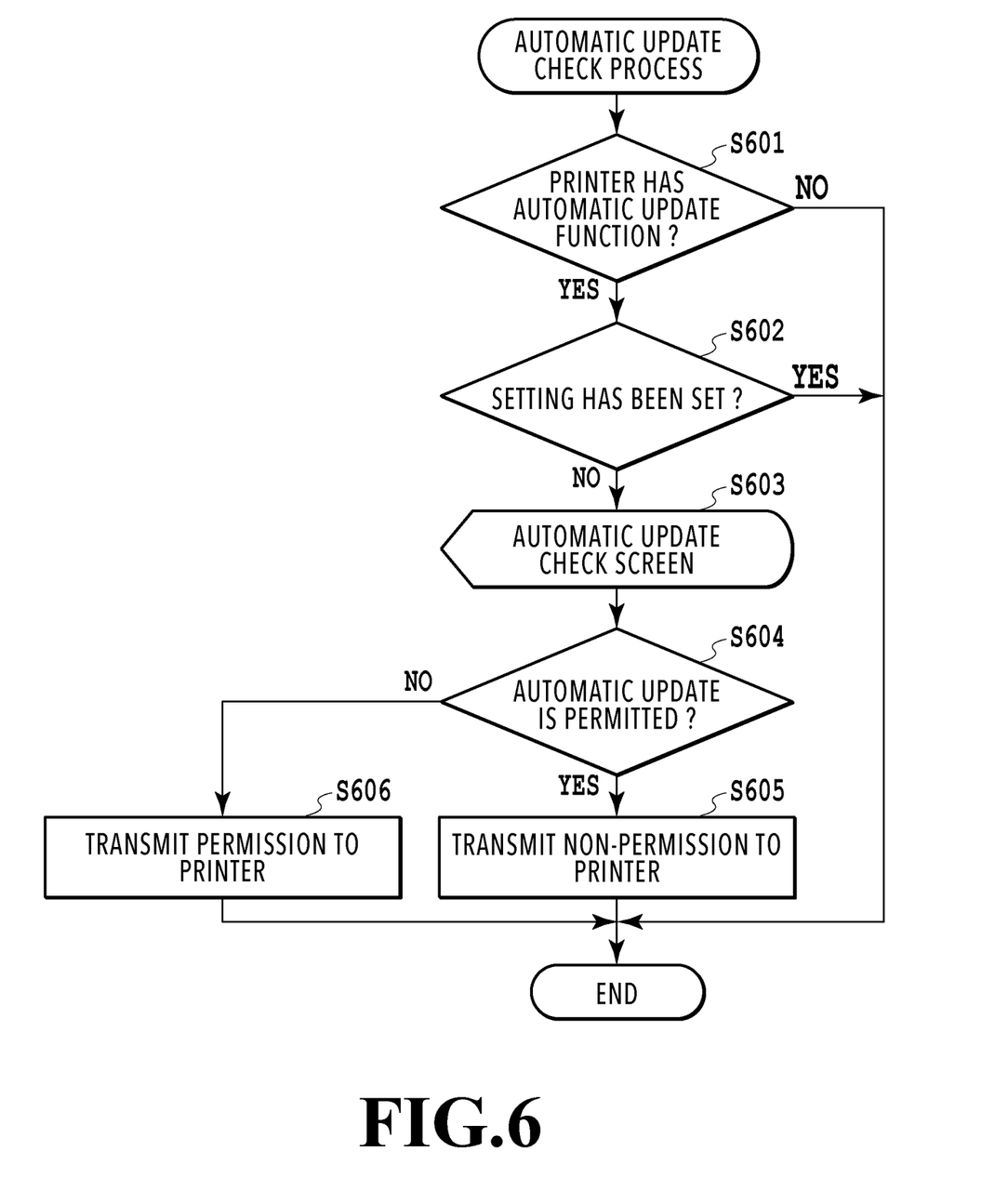
FIG. 6 is a flowchart illustrating the automatic update check process.

FIG. 6 is a flowchart illustrating the automatic update check process in the PC 100. The automatic update check process of FIG. 6 describes the process in S207 of FIG. 2.

In the case where the automatic update check process is started, in S601, the CPU 101 refers to the information on the printer 110 obtained in S202 of FIG. 2, and it determines whether the printer 110 has the automatic update function. In the case where the CPU 101 determines that the printer 110 does not have the automatic update function in the determination of S601, the CPU 101 terminates the automatic update check process. In the description of FIG. 6 hereinafter, description is given assuming that the information obtained in S202 of FIG. 2 is used as the information on the printer 110 referred to by the CPU 101. The printer 110 having no automatic update function is, for example, a printer 110 that has no network communication function using a wireless LAN or a wired LAN and that cannot communicate with the update server. Moreover, the printer 110 having no automatic update function may be an apparatus that has the network communication function but does not have the automatic update function, depending on a model of the apparatus. The printer 110 having no automatic update function executes the firmware update based on, for example, reception of an operation for the firmware update from the user, the operation being an operation different from the operation for enabling or disabling the automatic update function. Moreover, the printer 110 executes the firmware update by, for example, downloading the data for installing the firmware of the newer version through USB connection with the PC 100.

In the case where the CPU 101 determines that the printer 110 has the automatic update function in the determination of S601, the CPU 101 proceeds to S602, and it determines whether the user has already set the automatic update setting of the printer 110. The case where the user has already set the automatic update setting is the case where the printer 110 is in the state where the automatic update function is enabled or in the state where the automatic update function is disabled. Meanwhile, the case where the user has not set the automatic update setting yet is the case where the printer 110 is in the state where no setting relating to the automatic update function has been performed. The PC 100 may perform this determination based on the information received in S202 or by checking the setting storage unit 550 included in the ROM 112 of the printer 110. In the former case, the information obtained in S202 includes information indicating a state relating to the automatic update function of the printer 110. In the case where the CPU 101 determines that the user has already set the automatic update setting (Yes), the CPU 101 terminates the automatic update check process without executing display of an automatic update check screen 410 to be described later.

In the case where the CPU 101 determines that the automatic update setting has not been set yet in the determination of S602 (No), the CPU 101 proceeds to S603, and it displays the automatic update check screen 410 illustrated in FIG. 4B on the display device 104. The automatic update check screen 410 includes a button 411 for permitting the automatic update and a button 412 for not permitting the automatic update. Note that permitting the automatic update corresponds to executing the setting of enabling the automatic update function. Moreover, not permitting the automatic update corresponds to executing the setting of disabling the automatic update function. In S604, the CPU 101 determines whether the user permits the automatic update or not by pressing one of the buttons on the screen 410. In the case where the CPU 101 determines that the user permits the automatic update (Yes), in S605, the CPU 101 transmits a setting command corresponding to the user permitting the automatic update to the printer 110, and it terminates the automatic update check process. This setting command is a command for causing the printer 110 to execute the setting of enabling the automatic update function. In the case where the CPU 101 determines that the user does not permit the automatic update (No), in S606, the CPU 101 transmits a setting command corresponding to the user not permitting the automatic update to the printer 110, and it terminates the automatic update check process. This setting command is a command for causing the printer 110 to execute the setting of disabling the automatic update function.

In the case where the printer 110 receives the permission or non-permission information transmitted from the CPU 101, the CPU 111 of the printer 110 writes the received information into the automatic update setting information on the setting storage unit 550.

As described above, according to the present embodiment, the setting information is stored in the automatic update setting information of the setting storage unit 550 in both of the case where the enabled or disabled of the automatic update function is set based on the user operation on the printer 110 and the case where the enabled or disabled of the automatic update function is set based on the transmission of the setting command from the PC 100. Moreover, the PC 100 does not display the automatic update check screen 410 in the case where the PC 100 checks the setting storage unit 550 and the setting is done, and displays the automatic update check screen 410 in the case where the PC 100 checks the setting storage unit 550 and the setting is undone. Accordingly, in the case where the user who has finished the initial installation by referring to the display device 114 of the printer 110 performs the setup of the PC 100 after the initial installation, the automatic update setting screen 410 is not displayed. Thus, the user is not inquired about the automatic update setting on the PC 100 again.

Also in the case where setup for the PC 130 different from the PC 100 using the printer 110 is performed, performing the same processes causes the PC 130 not to prompt the user to perform the automatic update setting if the automatic update setting is already performed.

By applying the present embodiment, the PC 100 is provided with a determination unit that determines whether predetermined setting in the printer 110 has been done or not in one of a setting unit of the printer 110 and a setting unit of the PC 100. Moreover, a display unit of the PC 100 displays the screen prompting the predetermined setting, based on a determination result of the determination unit. This can provide an information processing system, an information processing method, and a storage medium that can suppress overlapping prompting of the setting and suppress an unexpected setting from being made in the usage.

Second Embodiment

A second embodiment of the present invention is described below with reference to the drawings. Note that, since the basic configuration of the present embodiment is the same as that of the first embodiment, characteristic configurations are described below. In the present embodiment, the user is appropriately prompted to perform the automatic update setting without the check of the automatic update setting state on the setting storage unit in the automatic update check process in the PC 100. The automatic update check process in the printer 110 is the same as that in the first embodiment.

Figure 7:
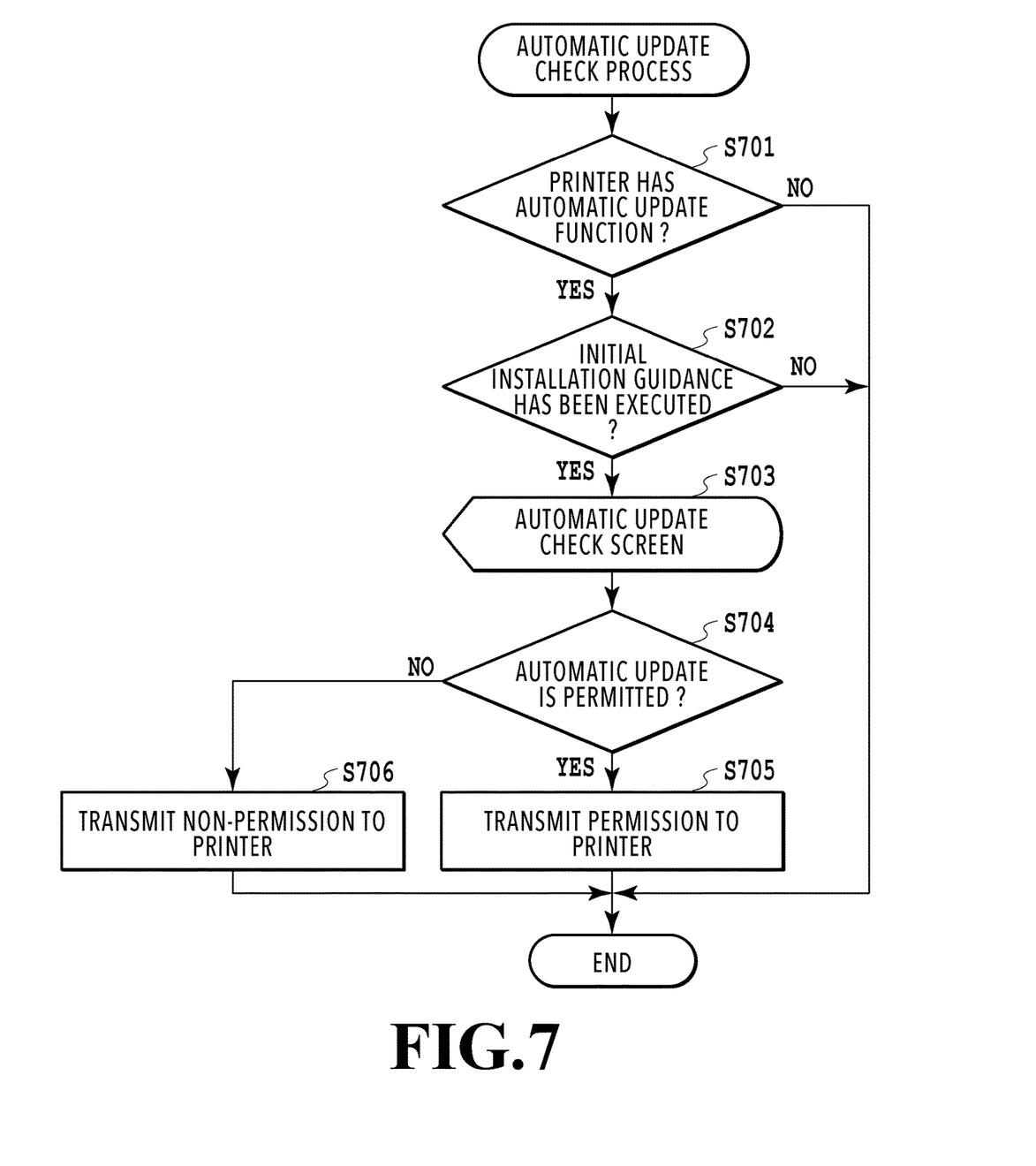
FIG. 7 is a flowchart illustrating an automatic update check process.

FIG. 7 is a flowchart illustrating an automatic update check process in the PC 100 of the present embodiment. The automatic update check process of FIG. 7 describes the process in S207 of FIG. 2.

The automatic update check process in the present embodiment is different from the automatic update check process in the first embodiment described in FIG. 6, in the process of S702. Since the processes other than S702 are the same as those in the first embodiment, description thereof is omitted.

In the case where the CPU 101 determines that the printer 110 has the automatic update function in the determination of S701, the CPU 101 proceeds to S702, and determines whether the process of S204 in FIG. 2 has been executed. The case where the process of S204 has not been executed corresponds to the case where the determination of YES is made in S203 executed for the first time. Meanwhile, the case where the process of S204 is executed corresponds to the case where the determination of NO is made in S203 executed for the first time. In the case where the process of S204 is not executed and the guidance on the execution of the initial installation job is not made (No), the CPU 101 determines that the initial installation process is completed in the printer 110 and at least the automatic setting check has been performed (S224) in the printer 110 after the completion, and terminates the automatic update check process.

In the case where the CPU 101 determines that the process of S204 has been executed and the guidance on the execution of the initial installation job has been made (Yes) in the determination of S702, the CPU 101 proceeds to S703, and displays the automatic update check screen 410 illustrated in FIG. 4B on the display device 104. The guidance on the execution of the initial installation job being made means that the printer 110 is in the state where the initial installation is undone, and the initial installation process is undone. Accordingly, the CPU 101 can determine that the automatic update check also has not been performed. Moreover, as described above, the setup process 200 and the printer initial setting process 220 in FIG. 2 are not performed simultaneously, and the initial installation process is performed in one of the processes 200 and 220. Accordingly, the case where the initial installation is confirmed to be undone on the PC side and then the automatic update check is performed on the printer side does not occur. The PC 100 can thus determine that the automatic update check is not performed based on the initial installation process being undone in the printer 110. Note that S705 and S706 are the same as the processes described in S605 and S606.

The PC 100 can appropriately determine whether to prompt the user to set the setting the automatic update setting by determining whether the initial installation guidance of the printer 110 has been performed in S204 of FIG. 2 or not. This can provide an information processing system, an information processing method, and a storage medium that can suppress overlapping prompting of the setting and suppress an unexpected setting from being made in the usage.

Third Embodiment

A third embodiment of the present invention is described below with reference to the drawings. Note that, since the basic configuration of the present embodiment is the same as that of the first embodiment, characteristic configurations are described below. The user who desires to change the automatic update setting may search the setting screens of the printer 110 for the automatic update setting screen, and the user can set the automatic update setting. The user who has performed the setting on the PC 100 in the past expects that the setting is to be performed on the PC 100 again. Accordingly, in the present embodiment, a configuration in consideration of the user who has performed the setting on the PC 100 in the past is described by using FIG. 8.

Figure 8:
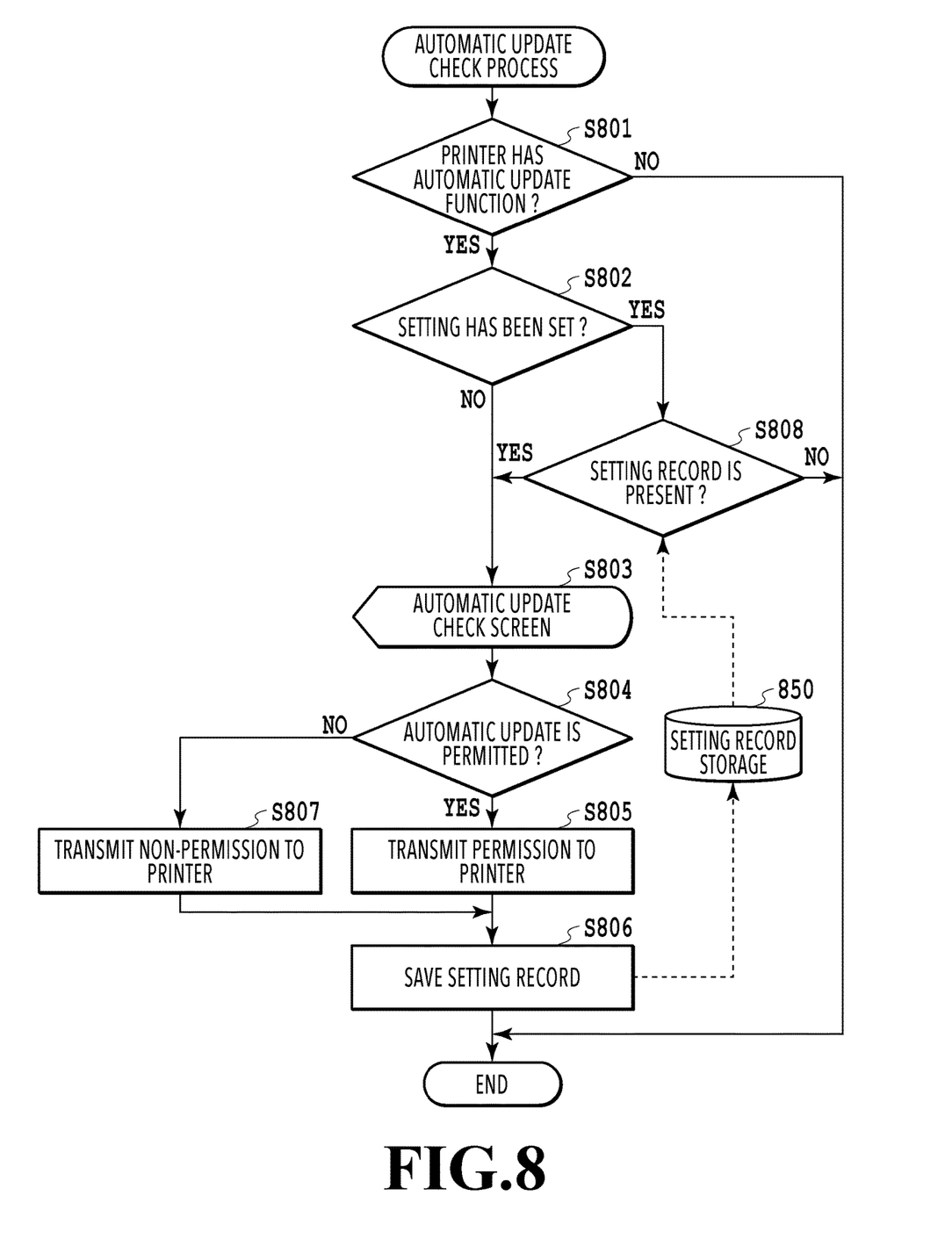
FIG. 8 is a flowchart illustrating an automatic update check process.

FIG. 8 is a flowchart illustrating an automatic update check process in the PC 100 of the present embodiment. The automatic update check process of FIG. 8 describes the process in S207 of FIG. 2.

In the case where the automatic update check process is started, in S801, the CPU 101 refers to the information on the printer 110 obtained in S202 of FIG. 2, and it determines whether the printer 110 has the automatic update function. In the case where the CPU 101 determines that the printer 110 does not have the automatic update function in the determination of S801, the CPU 101 terminates the automatic update check process.

In the case where the CPU 101 determines that the printer 110 has the automatic update function in the determination of S801, the CPU 101 proceeds to S802, and it determines whether the automatic update setting of the printer 110 has been already set by the user. The PC 100 performs this determination by checking the setting storage unit 550 included in the ROM 112 of the printer 110. In the case where the CPU 101 determines that the automatic update setting has been already set by the user (Yes), the CPU 101 proceeds to S808, and it determines presence or absence of a setting record in the PC 100. In the case where the CPU 101 determines that the setting record in the PC 100 is absent in S808, the CPU 101 terminates the automatic update check process. In the case where the CPU 101 determines that the setting record in the PC 100 is present in S808, the CPU 101 proceeds to S803, and it displays the automatic update check screen 410 illustrated in FIG. 4B, on the display device 104. Then, in S804, the CPU 101 determines whether the user permits the automatic update or not by pressing one of the buttons on the screen 410. In the case where the CPU 101 determines that the user permits the automatic update (Yes), in S805, the CPU 101 transmits the permission of the automatic update by the user to the printer 110. Moreover, in the case where the CPU 101 determines that the user does not permit the automatic update in S804 (No), in S807, the CPU 101 transmits the non-permission of the automatic update by the user to the printer 110.

Then, the CPU 101 proceeds to S806, saves the execution of the setting check in the PC 100 in a setting record storage 850 of the PC 100, and terminates the automatic update check process.

Storing whether the user has executed the automatic update setting in the PC 100 as described above allows the PC 100 to perform the setting check again, if the PC 100 is the PC 100 on which the automatic update setting is executed. This can provide an information processing system, an information processing method, and a non-transitory computer readable storage medium that can suppress overlapping prompting of the setting and suppress an unexpected setting from being made in the usage.

Other Embodiments

In the description of the above embodiments, there is described the example of the form in which the check screen relating to the setting of the automatic update function is switched between display and non-display based on whether the automatic update setting has been performed in the printer 110 or not. However, the present invention is not limited to this. The present invention can be also applied to any setting for which the setting check is desired to be performed at least once on the printer 110. For example, settings to which the present invention can be applied include a setting relating to a function of automatically turning the power of the printer 110 on or off, a time setting of whether to turn the power on or off in the case where the above setting is on and no operation is performed for certain time, a password setting for login to a management web screen of the printer 110, and the like. Moreover, the setting to which the present invention can be applied may be the aforementioned notification function. The present invention may be applied to multiple settings. Note that, although the case where the setting check is performed in S603 of FIGS. 6 and S803 of FIG. 8 in the case where the CPU 101 determines that the setting is not set is described, the present invention is not limited to this. Specifically, assume that there is an already-set setting item, and setting this setting item to non-permission is known to be disadvantageous for the user. The configuration may be such that, for such a setting item, the user is notified of presence of disadvantage, and the setting check is performed again in the case where the setting is set to non-permission, in addition to the case where the setting is not set.

Moreover, although description is given assuming that the setup program 108 is software operating on Windows OS, the present embodiment holds also in the case where the setup program 108 is software operating on other OSs. FIG. 4C is a diagram illustrating a screen in which an application 420 operating on Android OS displays the setting check as a pop-up screen 421. As described above, the setup program 108 may be software operating on Android OS.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central process unit (CPU), micro process unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-165808, filed Oct. 14, 2022, which is hereby incorporated by reference wherein in its entirety.

What is claimed is:

1. A control method of an information processing apparatus capable of communicating with an electronic apparatus, comprising:
   obtaining first information from the electronic apparatus, the first information corresponding to whether setting relating to a predetermined setting item has been already performed or not in the electronic apparatus,
   performing control such that a setting screen for performing the setting relating to the predetermined setting item is displayed on a display unit of the information processing apparatus, based on that the first information obtained from the electronic apparatus is information corresponding to a fact that the setting relating to the predetermined setting item has not been performed yet in the electronic apparatus, and performing control such that the setting screen is not displayed on the display unit, based on that the first information obtained from the electronic apparatus is information corresponding to a fact that the setting relating to the predetermined setting item has been already performed in the electronic apparatus; and
   transmitting second information to the electronic apparatus based on an input in the setting screen, the second information being information for performing the setting relating to the predetermined setting item on the electronic apparatus, wherein
   in a case where the electronic apparatus receives the second information, the setting relating to the predetermined setting item is executed in the electronic apparatus based on the second information.

2. The control method according to claim 1, further comprising obtaining third information from the electronic apparatus, the third information corresponding to whether an initial installation process of the electronic apparatus has been already completed or not, wherein the control is performed such that the setting screen is displayed on the display unit, based on that the first information obtained from the electronic apparatus is the information corresponding to the fact that the setting relating to the predetermined setting item has not been performed yet in the electronic apparatus and the third information obtained from the electronic apparatus is information corresponding to a fact that the initial installation process of the electronic apparatus has been already completed.

3. The control method according to claim 2, further comprises performing control such that a guidance screen for prompting a user to execute a job for the initial installation process in the electronic apparatus is displayed on the display unit, based on that the third information obtained from the electronic apparatus is information corresponding to a fact that the initial installation process of the electronic apparatus has not been completed yet, and performing control such that the guidance screen is not displayed on the display unit, based on that the third information obtained from the electronic apparatus is the information corresponding to the fact that the initial installation process of the electronic apparatus has been already completed.

4. The control method according to claim 2, wherein the initial installation process includes at least one of a process of receiving a job of mounting an ink cartridge from a user, a process of receiving a job of setting printing paper from the user, a registration process, a process of receiving setting of current time from the user, a process of receiving setting of a country in which the electronic apparatus is used from the user, a process of detecting presence or absence of abnormality in a print head, and a process of detecting removal of a fixation member by the user, the fixation member configured to fix the print head.

5. The control method according to claim 2, wherein the initial installation process is a process that is started based on power-on of the electronic apparatus in a state where the initial installation process has not been completed yet in the electronic apparatus.

6. The control method according to claim 1, further comprising an obtaining fourth information from the electronic apparatus, the fourth information corresponding to whether the electronic apparatus has a predetermined function corresponding to the predetermined setting item or not, wherein the control is performed such that the setting screen is displayed on the display unit, based on that the first information obtained from the electronic apparatus is the information corresponding to the fact that the setting relating to the predetermined setting item has not been performed yet in the electronic apparatus and the fourth information obtained from the electronic apparatus is information corresponding to a fact that the electronic apparatus has the predetermined function, and the control is performed such that the setting screen is not displayed on the display unit based on that the fourth information obtained from the electronic apparatus is information corresponding to a fact that the electronic apparatus does not have the predetermined function.

7. The control method according to claim 1, wherein the control is performed such that the setting screen is displayed on the display unit, based on that the first information obtained from the electronic apparatus is the information corresponding to the fact that the setting relating to the predetermined setting item has been already performed in the electronic apparatus and a record of transmission of the second information to the electronic apparatus by the information processing apparatus is present, and the control is performed such that the setting screen is not displayed on the display unit, based on that the first information obtained from the electronic apparatus is information corresponding to the fact that the setting relating to the predetermined setting item has been already performed in the electronic apparatus and the record of transmission of the second information to the electronic apparatus by the information processing apparatus is absent.

8. The control method according to claim 1, wherein the setting relating to the predetermined setting item includes a setting relating to an automatic update function of automatically updating firmware saved in a storage area of the electronic apparatus.

9. The control method according to claim 1, wherein the setting relating to the predetermined setting item includes at least one of a setting relating to a function of automatically turning power of the electronic apparatus on or off and a password setting for login to a management web screen of the electronic apparatus.

10. The control method according to claim 1, wherein, in a case where a predetermined reset operation is executed on the electronic apparatus after execution of the setting relating to the predetermined setting item in the electronic apparatus, a state of the electronic apparatus is reset to a state where the setting relating to the predetermined setting item has not been performed yet.

11. The control method according to claim 10, wherein a screen for receiving the predetermined reset operation is a screen that is displayed in the electronic apparatus after completion of an initial installation process of the electronic apparatus.

12. The control method according to claim 10, wherein a state where the setting relating to the predetermined setting item has not been performed yet in the electronic apparatus is a state after the state of the electronic apparatus is reset to the state where the setting relating to the predetermined setting item has not been performed yet.

13. The control method according to claim 1, wherein in a case where the input in the setting screen is an input corresponding to permission of a predetermined function corresponding to the predetermined setting item, the second information is information for executing setting of permitting the predetermined function on the electronic apparatus, and in a case where the input in setting screen is an input corresponding to non-permission of the predetermined function, the second information is information for executing setting of not permitting the predetermined function on the electronic apparatus.

14. The control method according to claim 1, wherein the setting relating to the predetermined setting item is executed based also on an input in a second setting screen displayed by the electronic apparatus.

15. The control method according to claim 14, wherein a state where the setting relating to the predetermined setting item has not been performed yet in the electronic apparatus is a state where the input in the second setting screen is not performed.

16. The control method according to claim 1, further comprising transmitting information on an external access point to the electronic apparatus.

17. The control method according to claim 1, wherein the electronic apparatus is a printer.

18. A control method of an information processing apparatus capable of communicating with an electronic apparatus, comprising:
- obtaining first information from the electronic apparatus, the first information corresponding to whether an initial installation process of the electronic apparatus has been already completed or not;
- performing control such that a setting screen for performing setting relating to a predetermined setting item is displayed on a display unit of the information processing apparatus, based on that the first information obtained from the electronic apparatus is information corresponding to a fact that the initial installation process of the electronic apparatus has not been completed yet, and performing control such that the setting screen is not displayed on the display unit, based on that the first information obtained from the electronic apparatus is information corresponding to a fact that the initial installation process of the electronic apparatus has been already completed; and
- transmitting second information to the electronic apparatus based on an input in the setting screen, the second information being information for performing the setting relating to the predetermined setting item, wherein
- in a case where the electronic apparatus receives the second information, the setting relating to the predetermined setting item is executed in the electronic apparatus based on the second information.

19. The control method according to claim 18, wherein
- the control is performed such that a guidance screen for prompting a user to execute a job for the initial installation process in the electronic apparatus is displayed on the display unit, based on that the first information obtained from the electronic apparatus is information corresponding to a fact that the initial installation process of the electronic apparatus has not been completed yet,
- the control method further comprises performing control such that the guidance screen is not displayed on the display unit, based on that the first information obtained from the electronic apparatus is the information corresponding to the fact that the initial installation process of the electronic apparatus has been already completed, and
- the control is performed such that the setting screen for performing the setting relating to the predetermined setting item is displayed on the display unit of the information processing apparatus, based on that the first information obtained from the electronic apparatus is the information corresponding to the fact that the initial installation process of the electronic apparatus has not been completed yet, and is performed such that the setting screen is not displayed on the display unit, based on that the first information obtained from the electronic apparatus is the information corresponding to the fact that the initial installation process of the electronic apparatus has been already completed and the guidance screen is not displayed.

20. A non-transitory computer readable storage medium storing a program that causes a computer of an information processing apparatus capable of communicating with an electronic apparatus to perform processing comprising:
- obtaining first information from the electronic apparatus, the first information corresponding to whether setting relating to a predetermined setting item has been already performed or not in the electronic apparatus,
- performing control such that a setting screen for performing the setting relating to the predetermined setting item is displayed on a display unit of the information processing apparatus, based on that the first information obtained from the electronic apparatus is information corresponding to a fact that the setting relating to the predetermined setting item has not been performed yet in the electronic apparatus, and performing control such that the setting screen is not displayed on the display unit, based on that the first information obtained from the electronic apparatus is information corresponding to a fact that the setting relating to the predetermined setting item has been already performed in the electronic apparatus; and
- transmitting second information to the electronic apparatus based on an input in the setting screen, the second information being information for performing the setting relating to the predetermined setting item on the electronic apparatus, wherein
- in a case where the electronic apparatus receives the second information, the setting relating to the predetermined setting item is executed in the electronic apparatus based on the second information.

* * * * *